United States Patent
Hayashi et al.

(10) Patent No.: US 8,746,733 B2
(45) Date of Patent: Jun. 10, 2014

(54) PILLAR GARNISH

(71) Applicant: Hayashi Telempu Co., Ltd., Nagoya (JP)

(72) Inventors: Ken-ichi Hayashi, Nagoya (JP);
Hiroyuki Omiya, Nagoya (JP)

(73) Assignee: Hayashi Telempu Co., Ltd., Nagoya (JP)

( * ) Notice: Subject to any disclaimer, the term of this patent is extended or adjusted under 35 U.S.C. 154(b) by 0 days.

(21) Appl. No.: 13/717,625

(22) Filed: Dec. 17, 2012

(65) Prior Publication Data

US 2013/0249198 A1 Sep. 26, 2013

(30) Foreign Application Priority Data

Dec. 21, 2011 (JP) ................. 2011-279591

(51) Int. Cl.
*B60R 21/215* (2011.01)
(52) U.S. Cl.
USPC .............. 280/730.2; 296/193.06; 296/187.03
(58) Field of Classification Search
USPC ...................... 280/730.2; 296/187.12, 193.06
See application file for complete search history.

(56) References Cited

U.S. PATENT DOCUMENTS

| | | | | |
|---|---|---|---|---|
| 4,270,328 A * | 6/1981 | Page et al. | ........................ | 52/511 |
| 6,196,607 B1 * | 3/2001 | Gulisano | ...................... | 296/39.1 |
| 6,254,123 B1 * | 7/2001 | Urushi et al. | .............. | 280/730.2 |
| 6,305,707 B1 * | 10/2001 | Ishiyama et al. | ........... | 280/728.2 |
| 6,485,049 B1 * | 11/2002 | Prottengeier et al. | ...... | 280/730.2 |
| 6,672,027 B2 * | 1/2004 | Mizutani et al. | ............. | 52/716.5 |
| 6,843,502 B2 * | 1/2005 | Aoki et al. | .................. | 280/730.2 |
| 7,011,337 B2 * | 3/2006 | Aoki et al. | .................. | 280/730.2 |
| 7,172,211 B2 * | 2/2007 | Hirose | ........................ | 280/730.2 |
| 7,178,855 B2 * | 2/2007 | Catron et al. | .............. | 296/146.7 |
| 7,578,521 B2 * | 8/2009 | Downey et al. | ............ | 280/730.2 |
| 7,607,684 B2 * | 10/2009 | Downey et al. | ............ | 280/730.2 |
| 7,621,556 B2 * | 11/2009 | Itakura | ........................ | 280/728.2 |
| 7,810,838 B2 * | 10/2010 | Iwayama et al. | ........... | 280/730.2 |
| 7,934,748 B2 * | 5/2011 | Torii | ........................... | 280/730.2 |
| 7,963,551 B2 * | 6/2011 | Matsuoka et al. | .......... | 280/730.2 |
| 8,002,311 B2 * | 8/2011 | Card et al. | ................... | 280/730.2 |
| 8,297,676 B2 * | 10/2012 | Osterhout et al. | ........... | 296/1.08 |
| 2004/0160078 A1 * | 8/2004 | Hwang | ......................... | 296/39.1 |
| 2004/0256843 A1 * | 12/2004 | Totani et al. | ............... | 280/730.2 |

(Continued)

FOREIGN PATENT DOCUMENTS

| | | | |
|---|---|---|---|
| JP | 3125729 B2 | 11/2000 | |
| JP | 4211825 B2 | 11/2008 | |
| JP | 4590804 B2 | 9/2010 | |

*Primary Examiner* — Nicole Verley
(74) *Attorney, Agent, or Firm* — Knobbe Martens Olson & Bear LLP

(57) ABSTRACT

The pillar garnish has a main body, an extension part that is formed integrally with the main body, including a guide surface at an upper end of the extension part, the guide surface controlling a direction in which the air bag apparatus is unfolded so that the air bag apparatus is unfolded into the interior of the vehicle when the air bag apparatus is inflated, and a box portion that is formed integrally with the main body and the extension part, the box portion being positioned between the main body and the pillar. The box portion has a back wall portion and a pair of side wall portions that are adjacent to the back wall portion and the main body. The side wall portion has a thick portion and a thin portion, the thin portion being disposed closer to the main body than to the back wall portion.

5 Claims, 6 Drawing Sheets

(56) References Cited

U.S. PATENT DOCUMENTS

| | | | |
|---|---|---|---|
| 2005/0253366 A1* | 11/2005 | Uno et al. | 280/730.2 |
| 2006/0082108 A1* | 4/2006 | Wahara et al. | 280/730.2 |
| 2006/0220356 A1* | 10/2006 | Baekelandt | 280/730.2 |
| 2006/0220357 A1* | 10/2006 | Lizak | 280/730.2 |
| 2007/0075531 A1* | 4/2007 | Tsuge | 280/730.2 |
| 2007/0138777 A1* | 6/2007 | Oh | 280/740 |
| 2007/0241540 A1* | 10/2007 | Takemura et al. | 280/728.2 |
| 2012/0267879 A1* | 10/2012 | Kim et al. | 280/730.2 |

* cited by examiner

US 8,746,733 B2

PILLAR GARNISH

The present application is based on, and claims priority from, J.P. Application No. 2011-279591, filed Dec. 21, 2011 the disclosure of which is hereby incorporated by reference herein in its entirety.

BACKGROUND OF THE INVENTION

1. Field of the Invention

The present invention relates to a pillar garnish disposed in a vehicle having a curtain side air bag apparatus, more particularly, to a pillar garnish provided with a guide surface that is formed integrally with the pillar garnish in the upper part of the pillar garnish, wherein the guide surface guides the direction in which an inflating air bag unfolds.

2. Description of the Related Art

A curtain side air bag apparatus is disposed above a pillar garnish in order to protect the passenger's head in case of a vehicle accident. A pair of the curtain side air bag apparatuses is disposed in a folded manner in the vicinity of both left and right edges of the roof trim and are unfolded downwards like curtains. The roof trim is made of an interior material that extends from above front pillars (A pillars) to the rear part of the interior of the vehicle beyond center pillars (B-pillars) and covers the roof panel of the vehicle. When the curtain side air bag apparatus is subjected to an impact load, the air bag in the folded state is inflated and unfolds downwards due to inflation gas that flows into the air bag, then the air bag opens the side edge of the roof trim so that the apparatus is unfolded like a curtain between the pillar garnish and the passenger in the interior of the vehicle.

Since the air bag is unfolded downwards from above the pillar garnish (unfolded in the longitudinal direction of the pillar garnish) to come into contact with the upper end of the pillar garnish, it is necessary to prevent the air bag from becoming caught between the pillar garnish and a pillar panel when the air bag is unfolded. There is known a pillar garnish that is provided with a guide surface for this purpose. The guide surface, which is formed integrally with and at the top of the pillar garnish, controls the direction in which the air bag unfolds so that the air bag is appropriately unfolded inward in the interior of the vehicle.

The pillar garnish having an integrally formed guide surface mentioned above is disclosed, for example, in JP3125729B, JP4590804B and JP4211825B. The pillar garnish having the guide surface guides the air bag so that it is unfolded inwards in the interior of the vehicle by means of the guide surface when the curtain air bag is unfolded. Such a pillar garnish reduces the possibility that the pillar garnish may become disengaged and scattered by the air bag that is caught by the upper end of the pillar garnish and reduces the possibility that damage will be caused to the passenger. Furthermore, the air bag is prevented from being unfolded between the pillar garnish and the pillar trim, and accordingly the pillar garnish is prevented from being sandwiched by the passenger and the air bag. Thus, the passenger protection function of the air bag can be appropriately ensured.

Although the guide surface brings about the above-mentioned advantage, the pillar garnish must be sufficiently stiff in the vertical direction in order to enhance the guiding function of the air bag when it is unfolded. On the other hand, when the impact load is not large enough to cause the curtain air bag to open, the passenger's head may move in the width direction of the vehicle, i.e., the direction that crosses the direction in which the air bag unfolds, and may collide against the pillar garnish. Even when the curtain air bag opens, the passenger's head may collide against the pillar garnish before the curtain air bag opens. Such events may increase the value of Head Injury Criterion (HIC). In case in which the passenger's head directly collides with the pillar garnish, a pillar garnish that is less stiff, and that therefore will more easily buckle or more easily become deformed, will provide better impact absorption characteristics for the passenger's head.

It is an object of the present invention to provide a pillar garnish that has higher stiffness in the vertical direction and limited stiffness in the width direction of a vehicle, i.e., the direction that crosses the vertical direction.

SUMMARY OF THE INVENTION

A pillar garnish of the present invention is configured to be mounted on a vehicle, the vehicle being provided with an air bag apparatus which is disposed between a left or right edge of a roof trim and a vehicle body panel and which extends in a front-rear direction of the vehicle, wherein the air bag apparatus is unfolded downwards from the left or right side of the vehicle into an interior of the vehicle due to an impact load. The pillar garnish comprises: a main body that covers a pillar of the vehicle from the interior of the vehicle; an extension part that is formed integrally with the main body, the extension part being positioned on an upper side of the main body when the pillar garnish is mounted on the vehicle, wherein the extension part includes a guide surface at an upper end of the extension part, the guide surface controlling a direction in which the air bag apparatus is unfolded so that the air bag apparatus is unfolded into the interior of the vehicle when the air bag apparatus is inflated; and a box portion that is formed integrally with the main body and the extension part, the box portion being positioned between the main body and the pillar when the pillar garnish is mounted on the vehicle. The box portion comprises: a back wall portion that extends in a vertical direction and that faces the pillar when the pillar garnish is mounted on the vehicle; a pair of side wall portions that are adjacent to the back wall portion and the main body and that extend in the vertical direction when the pillar garnish is mounted on the vehicle; and a fixing portion that is disposed near the back wall portion, the fixing portion fixing the pillar garnish to the pillar At least one of the side wall portions comprises a thick portion and a thin portion, the thin portion being disposed closer to the main body than to the back wall portion.

The stiffness of the pillar garnish in the vertical direction (the direction in which an air bag is unfolded) highly depends on the compression and shear stiffness of the side wall portion of the box portion, the side wall portion being integrated with the extension part. According to the invention, any decrease in the stiffness of the side wall portion can be minimized by the thick portion. An impact load that a passenger's head receives when the head collides with the pillar garnish is applied in the width direction of the vehicle, i.e., the direction that crosses the longitudinal direction of the pillar garnish. According to the invention, the impact absorption characteristics in the width direction of the vehicle can be enhanced by providing the side wall portion with the thin portion that has a reduced strength and that is easy to be deformed. Since the thin portion is positioned closer to the main body than to the back wall portion, the side wall portion tends to be fractured near the main body, i.e., on the side of the interior of the vehicle, and such a fracture pattern provides for an effect that enables additional absorption of the impact load. It is thereby possible to reduce the HIC value for the passenger's head that collides with the pillar garnish when the air bag is not unfolded. Therefore, it is possible for a pillar garnish that has an integrated guide surface for guiding the unfolded curtain side air bag apparatus to meet the incompatible requirements; increasing stiffness to enhance the function of the guide surface and reducing stiffness to ensure the impact absorption characteristics.

According to the present invention, it is possible to provide a pillar garnish that has higher stiffness in the vertical direction and limited stiffness in the width direction of a vehicle, i.e., the direction that crosses the vertical direction.

The above and other objects, features and advantages of the present invention will become apparent from the following description with reference to the accompanying drawings which illustrate examples of the present invention.

DETAILED DESCRIPTION OF THE PREFERRED EMBODIMENTS

Figure 1:
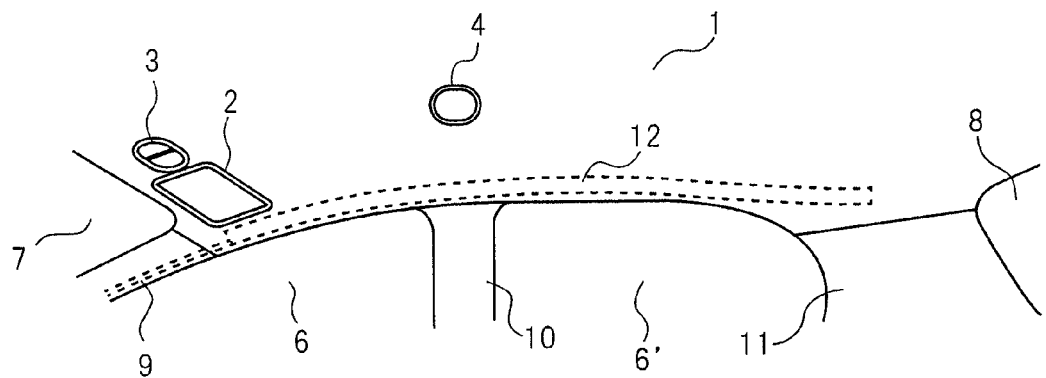
FIG. 1 is a partially broken perspective view of a vehicle provided with a B-pillar garnish according to an embodiment of the present invention.

Hereinafter, an embodiment of the present invention will be described with reference to the accompanying drawings. FIG. 1 is a perspective view illustrating part of a vehicle provided with a pillar garnish according to an embodiment of the present invention.

A vehicle has various interior parts inside thereof that cover the surface of the vehicle body panel. As shown in FIG. 1, roof trim 1 is mounted on the roof panel. Light shield parts, such as sun visor 2, and illumination parts, such as map lamp 3 and room lamp 4, are attached to roof trim 1 in the form of a module or directly attached to the roof panel.

Window frames that partition the windows into front window 7, side windows 6, 6' and rear window 8 consist of A-pillars (front pillars), B-pillars (center pillars) and C-pillars (quarter pillars). A-pillar garnish 9, B-pillar garnish 10 and C-pillar garnish 11 are mounted on the A-pillar, B-pillar and C-pillar, respectively.

Curtain side air bag apparatuses 12 are disposed in the vicinity of the left and right edges of roof trim 1 adjacent side windows 6, 6' and extend between roof trim 1 and the roof panel (vehicle body panel) in the front-rear direction of the vehicle. Curtain side air bag apparatus 12, the front end of which is located on the back side of A-pillar garnish 9, extends along the edge of roof trim 1, passes above B-pillar garnish 10 and reaches the rear end located near and above C pillar garnish 11.

When curtain side air bag apparatus 12 is subjected to an impact load in a car accident or the like, the inflator is activated to supply gas to the folded air bag so that the air bag is inflated. The air bags are unfolded downwards along side windows 6, 6' like a curtain. The passenger is prevented from being directly subjected to the impact load from side windows 6, 6' in a side crash accident, and thereby the HIC value can be reduced. Further, the passenger can be prevented from being thrown out of the vehicle and shattering of the window pane can also be avoided.

Figure 2:
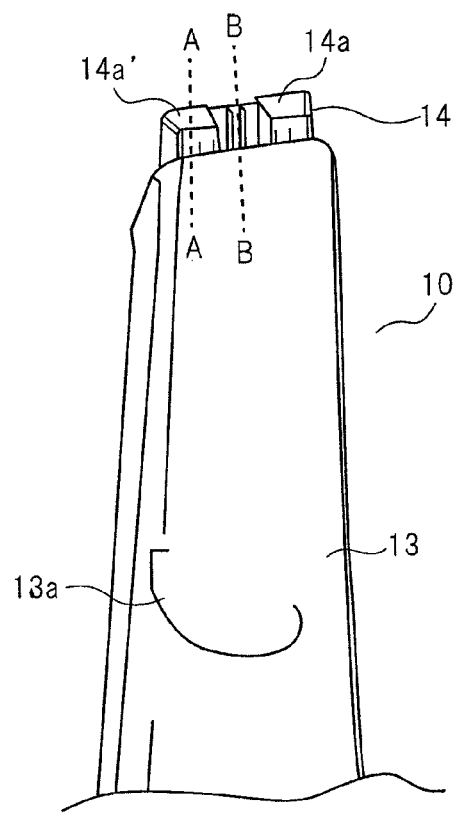
FIG. 2 is a front view of the B-pillar garnish shown in FIG. 1, viewed from the interior of the vehicle.
Figure 3:
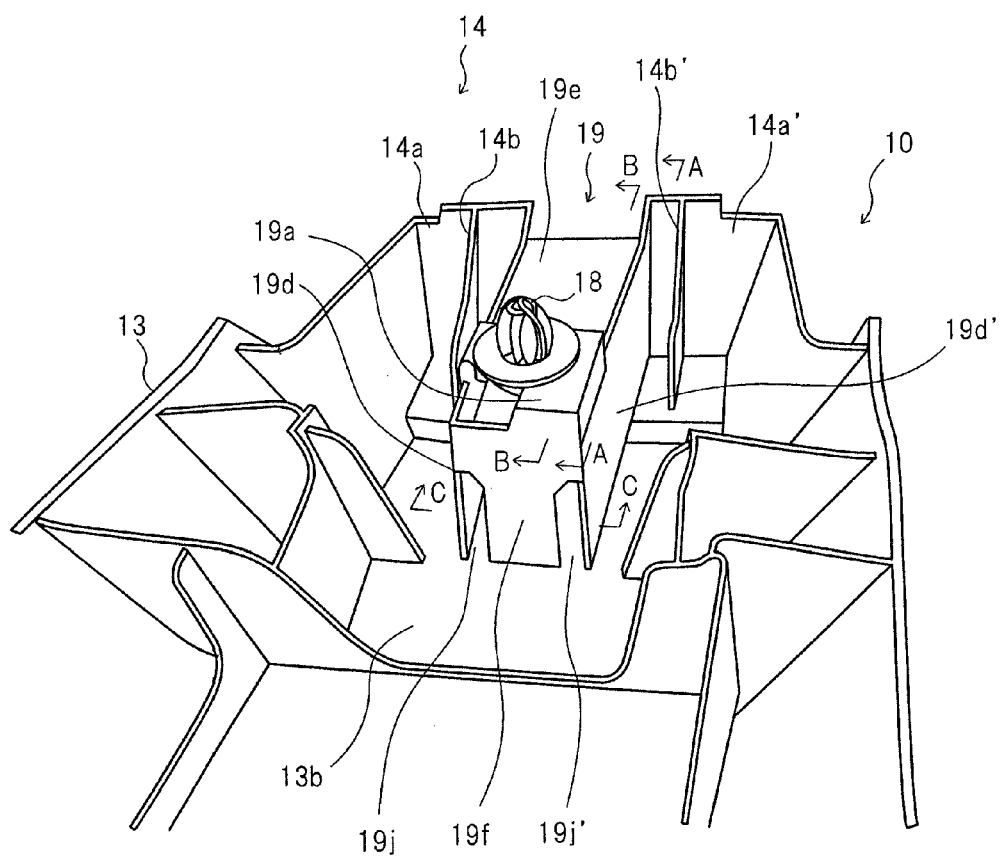
FIG. 3 is a perspective view of the B-pillar garnish shown in FIG. 1, viewed from the back side.

FIG. 2 shows a front view of the upper part of B-pillar garnish 10 viewed from the interior of the vehicle, and FIG. 3 shows a perspective view of the upper part of B-pillar garnish 10 viewed from the back side thereof (viewed from the pillar). Hereinafter, the present embodiment will be described by the example of the B-pillar garnish, but similar configurations can be applied to the pillar garnishes attached to the other pillars. When terms that mean directions, such as "up", "down", "left", "right" and "horizontal", are referred to in the following description, they mean the directions when B-pillar garnish 10 is mounted on the vehicle. Furthermore, the terms "front" and "back" mean the side of the pillar garnish that faces the interior of the vehicle and the side of the pillar garnish that faces the pillar, respectively.

B-pillar garnish 10 is an interior material that covers the B-pillar from the interior of the vehicle. The B-pillar extends between the front door and the rear door in the vertical direction of the vehicle. B-pillar garnish 10 includes main body 13, extension part 14 and box portion 19. Main body 13 covers the B-pillar from the interior of the vehicle. Extension part 14 protrudes from the vicinity of the upper end of main body 13 on the back side thereof. Box portion 19 is formed integrally with main body 13 and extension part 14. Box portion 19 is located between main body 13 and the pillar when the pillar garnish is mounted on the vehicle. Main body 13 is provided with hole 13a that allows a seatbelt to be inserted therethrough. In the upper part of extension part 14, guide surfaces 14a, 14a' for controlling the direction in which the air bag unfolds are formed integrally with extension part 14. Box portion 19 is formed in the upper part of back side 13b of main body 13 such that it protrudes from the interior of the vehicle toward the pillar. Box portion 19 has a function of fixing B-pillar garnish 10 to the pillar and a function of reinforcing extension part 14.

Figure 4:
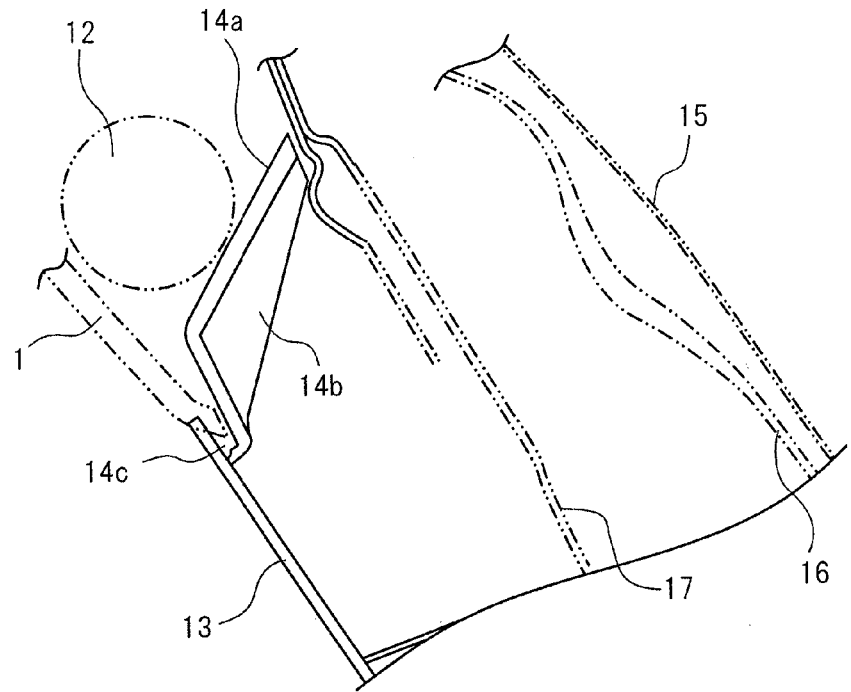
FIG. 4 is a cross-sectional view of FIGS. 2 and 3 cut along line A-A.
Figure 5:
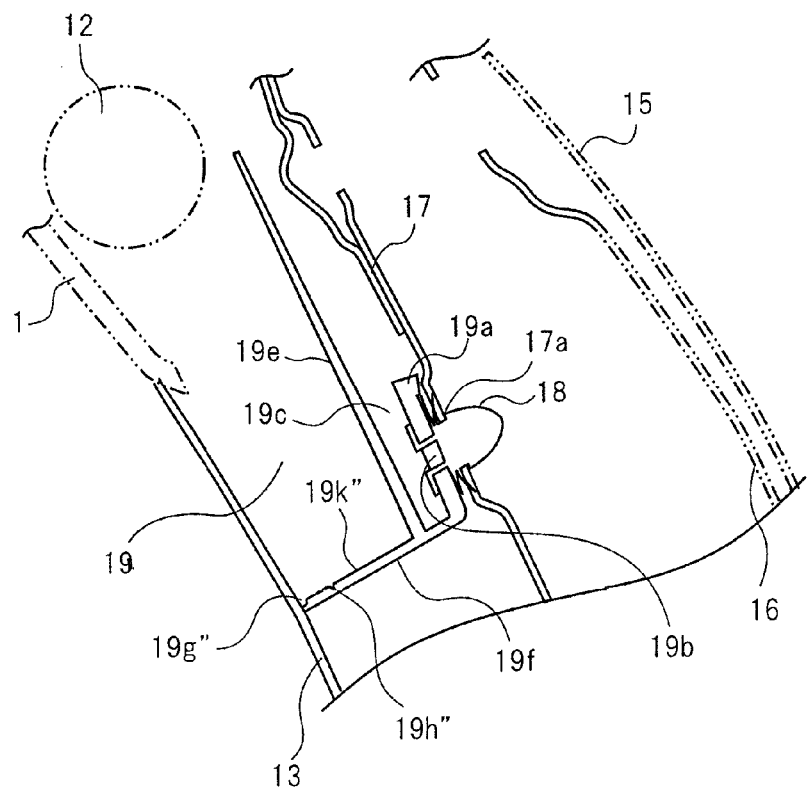
FIG. 5 is a cross-sectional view of FIGS. 2 and 3 cut along line B-B.

FIG. 4 is a cross-sectional view of B-pillar garnish 10 cut along line A-A of FIGS. 2 and 3, and FIG. 5 is a cross-sectional view cut along line B-B of FIGS. 2 and 3. In both figures, B-pillar garnish 10 is mounted on the pillar. As shown in the figures, the pillar of a vehicle consists of a plurality of panels, i.e., side outer panel 15, pillar outer panel 16 and pillar inner panel 17. These panels are disposed in this order from the outside of the vehicle toward the inside. Fixing member 18 that is attached to pillar garnish 10 is engaged with hole 17a of pillar inner panel 17, so that B-pillar garnish 10 is fixed to pillar inner panel 17 at the upper part of B-pillar garnish 10 and mounted on the vehicle body.

<Extension Part>

Extension part 14 is formed at the upper end of main body 13 of B-pillar garnish 10. Extension part 14 protrudes from back side 13b of main body 13 that faces pillar inner panel 17. Guide surfaces 14a, 14a' are formed in extension part 14 such that they traverse and partition the space between main body 13 of B-pillar garnish 10 and pillar inner panel 17 in the width direction of the vehicle and such that they are inclined with respect to the vertical and horizontal directions of the vehicle. The air bag of curtain side air bag apparatus 12 located above B-pillar garnish 10 comes into contact with guide surfaces 14a, 14a' when it is unfolded downwards. The air bag is then unfolded in a different direction, i.e., toward the inside of the vehicle, instead of continuing to unfold downwards in the vertical direction. In this way, the air bag is prevented from becoming caught between B-pillar garnish 10 and pillar inner panel 17 and the passenger protection function of curtain side air bag apparatus 12 can be ensured.

Reinforcement ribs 14b, 14b' are formed integrally with and on the back side of guide surfaces 14a, 14a'. Reinforcement ribs 14b, 14b' increase the stiffness of guide surfaces 14a, 14a' and makes the air bag guiding function more reliable and secure when the air bag of curtain side air bag apparatus 12 is unfolded.

Recess 14c is formed between the upper end of main body 13 of B-pillar garnish 10 and guide surfaces 14a, 14a' so that the end portion of roof trim 1 is engaged with recess 14c. The end portion of roof trim 1 is thereby easily held and prevented from being twisted. A good appearance can also be maintained because roof trim 1 and B-pillar garnish 10 are continuously connected.

When an impact load is applied to the vehicle and curtain side air bag apparatus 12 is activated, the air bag is unfolded downwards along guide surfaces 14a, 14a' that are provided in B-pillar garnish 10. The end portion of roof trim 1 is disengaged from air bag recess 14c so that the air bag is unfolded in the interior of the vehicle like a curtain while the end portion of roof trim 1 is pushed inwards in the interior of the vehicle.

<Box Portion (Fixing Means)>

Figure 6:
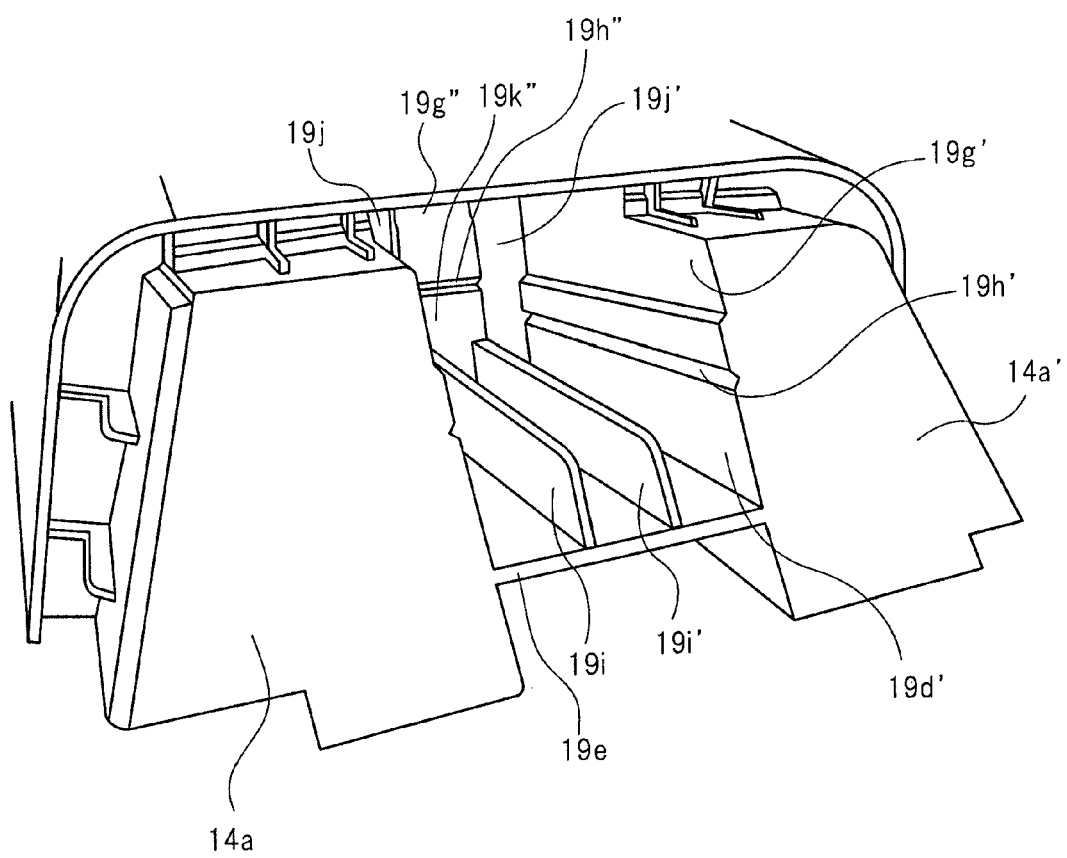
FIG. 6 is a perspective view of the B-pillar garnish shown in FIG. 1, viewed from above.

FIG. 6 shows a perspective view of B-pillar garnish 10 viewed from above. Referring to FIGS. 3 to 6, box portion 19 that protrudes on the back side of B-pillar garnish 10 is formed in the vicinity of extension part 14. Box portion 19 is formed integrally with main body 13 and extension part 14 and extends in the vertical direction between guide surfaces 14a, 14a' of extension part 14. Box portion 19 increases the stiffness of extension part 14, especially of guide surfaces 14a, 14a, and further improves the reliability of the air bag guiding function of guide surfaces 14a, 14a'. Box portion 19 extends between main body 13 and the pillar when it is mounted on the vehicle and reaches the vicinity of the upper end of main body 13 of B-pillar garnish 10. Box portion 19 includes, on the back side thereof that faces pillar inner panel 17, seat member 19a on which fixing member 18 is seated, fixing hole 19b through which fixing member 18 is inserted and opening 19c that houses a part of fixing member 18. These elements 19a to 19c are used to fix box portion 19 to the pillar (pillar inner panel 17) or to function as fixing means for the pillar garnish.

Box portion 19 consists of a pair of mutually opposed side wall portions 19d, 19d', back wall portion 19e and bottom wall portion 19f. Side wall portions 19d, 19d' protrude substantially perpendicularly from the back side of main body 13. Back wall portion 19e connects side wall portion 19d to side wall portion 19d'. Bottom wall portion 19f protrudes substantially perpendicularly from the back side of main body 13 and connects back wall portion 19e to main body 13. Side wall portions 19d, 19d' are formed integrally with and adjacent to back wall portion 19e and extend in the vertical direction when the pillar garnish is mounted on the vehicle. Back wall portion 19e faces the pillar (pillar inner panel 17) and extends in the vertical direction when the pillar garnish is mounted on the vehicle. Thus, side wall portions 19d, 19d' and back wall portion 19e, along with main body 13, form four sides of box portion 19 that extend in the longitudinal or vertical direction.

Back wall portion 19e connects side wall 19d and side wall 19d' at a position a predetermined distance below the upper end of side walls 19d, 19d' and therebelow and holds seat member 19a for fixing member 18. Seat member 19a bridges both edges of side walls 19d, 19d' on the side of the pillar and forms a space (opening 19c) for the engaging part of fixing member 18 between seat member 19a and back wall portion 19e. Bottom wall portion 19f connects side wall 19d to side wall 19d' at their bottom edges. The upper end of box portion 19 is open without being covered by a wall.

<Strength Control Structure>

As described above, box portion 19 is formed integrally with extension part 14, and box portion 19 is provided with three upright walls, i.e., a pair of side wall portions 19d, 19d' and bottom wall portion 19f, that protrude from back side 13b of main body 13 of pillar garnish 10. Box portion 19 increases the stiffness of extension part 14 that supports guide surfaces 14a, 14a' and improves the guiding function for the air bag when it is unfolded. On the other hand, this arrangement inevitably makes the upper part of pillar garnish 10 less deformable in the width direction of the vehicle and deteriorates the impact absorption characteristics.

Concerns have been increasing that passengers can be seriously injured when the passenger's head collides with the interior structure of a vehicle, such as the pillar garnish, in a minor crush accident where the curtain side air bag apparatus 12 is not activated or in a case where the passenger collides with the pillar garnish before the air bag is unfolded. Some countries, in an effort to cope with head injury accidents caused by these crushes, are establishing regulations on such an accident. For example, the United States FMVSS (Federal Motor Vehicle Safety Standard) 201 defines a method of a passenger protection test against an impact load in the interior of a vehicle. In this standard, requirements for upper interior components of a vehicle are described in Head Impact Protection (HIP), in which the requirement of Head Injury Criterion (HIC) d<1000 is stipulated as obligatory. The HIC is calculated from the deceleration value at a time when a free-flying head form (Free Motion Head Form: FMH) collides at a specific position, at a specific angle and at a specific b speed.

The pillar garnish of the present embodiment satisfies the requirement of the HIC in the above-mentioned impact test performed on the upper part of B-pillar garnish 10, while it maintains the guiding function for curtain side air bag apparatus 12 when it is unfolded. In other words, the pillar garnish of the present embodiment realizes the incompatible functions, i.e., high stiffness in the upper part of the pillar garnish and good impact absorption characteristics.

The head form (FMH) is launched from inside the interior of the vehicle toward B-pillar garnish 10, and the air bag is unfolded downwards from above B-pillar garnish 10 toward the upper part of B-pillar garnish 10. Thus, it is necessary for the upper part of the B-pillar garnish to maintain high stiffness in the vertical direction of the vehicle, i.e., the longitudinal direction of B-pillar garnish 10 and to have reduced strength in the width direction, of the vehicle, i.e., the direction that crosses the longitudinal direction of B-pillar garnish 10, in order to absorb the impact load more easily.

<Thin Portion>

Figure 7:
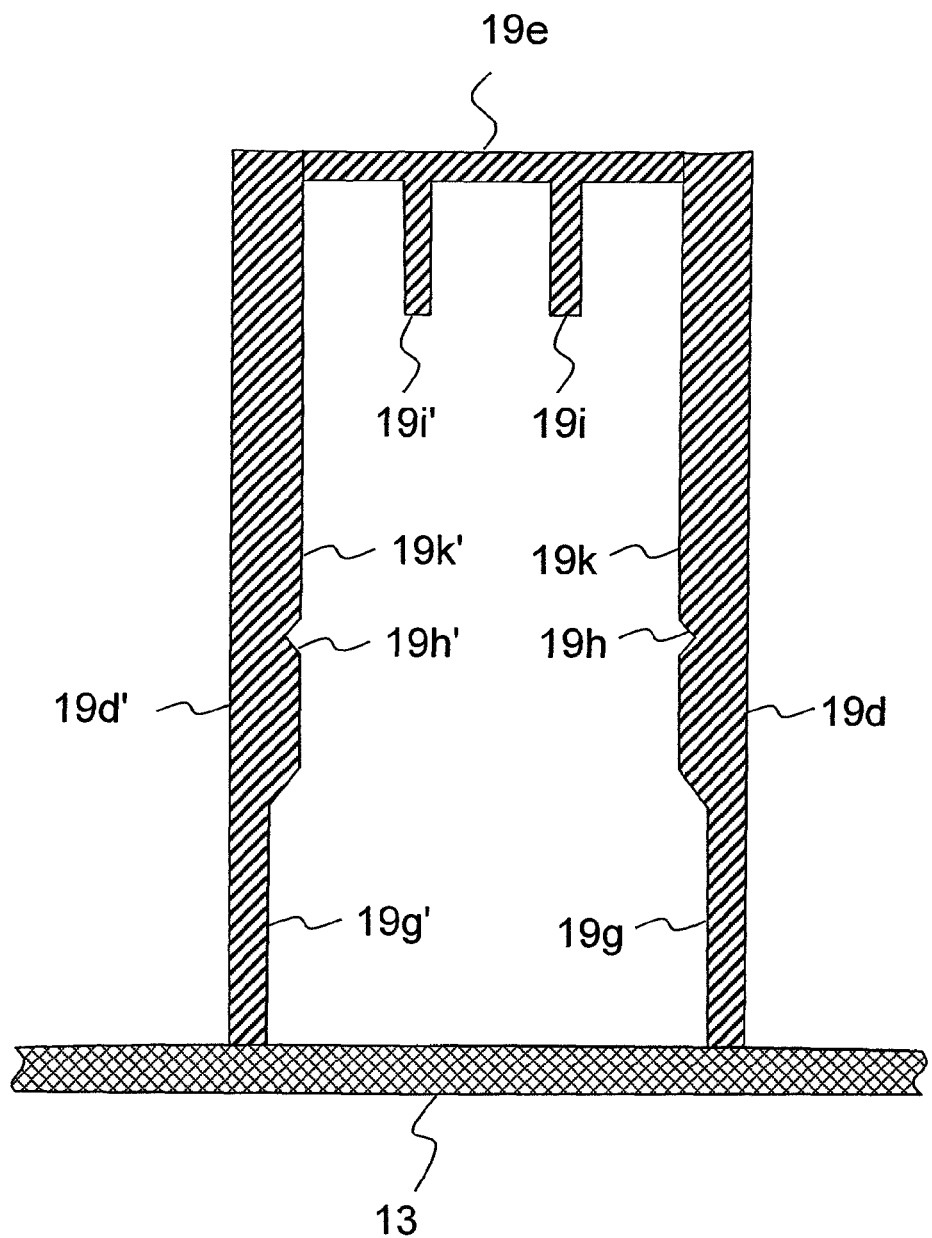
FIG. 7 is a cross-sectional view of FIG. 3 cut along line C-C.

Referring to FIG. 5 and FIG. 7 (FIG. 7 is a cross sectional view cut along line C-C of FIG. 3), the three upright walls that form box portion 19, i.e., a pair of side wall portions 19d, 19d' and bottom wall portion 19f, each have a thin portion and a thick portion. Specifically, side wall 19d has thin portion 19g and thick portion 19k that is thicker than thin portion 19g; side wall 19d' has thin portion 19g' and thick portion 19k' that is thicker than thin portion 19g' (FIG. 7); and bottom wall portion 19f has thin portion 19g" and thick portion 19k" that is thicker than thin portion 19g" (FIG. 5). Thin portions 19g, 19g', 19g" preferably have their center positions closer to the main body 13 than to the intermediate positions, which are located at the same distance from the edges on the side of back wall portion 19e and the edges on the side of the main body 13. In other words, thin portions 19g, 19g', 19g" of side wall portions 19d, 19d' and bottom wall portion 19f are preferably located closer to main body 13 than to back wall portion 19e. Thin portions 19g, 19g', 19g" need not be, and may be, formed distant from the connection line with main body 13. The thin portions may only be provided in any one or two of side wall portions 19d, 19d' and bottom wall portion 19f, but more preferably, they are provided in all of side wall portions 19d, 19d' and bottom wall portion 19f in order to improve the impact absorption characteristics. Side wall portions 19d, 19d' and bottom wall portion 19f are more easily buckled or deformed because thin portions 19g, 19g', 19g" become initiating points of such buckling or deformation when an impact load is applied from the interior of the vehicle to the upper part of pillar garnish 10. Nevertheless, the stiffness of side wall portions 19d, 19d' and bottom wall portion 19f in the vertical direction can be ensured by thick portions 19k, 19k', 19k". Thus, it is possible to enhance the impact absorption characteristics while maintaining the stiffness in the vertical direction. Furthermore, when thin portions 19g, 19g', 19g" are provided on the side of main body 13 of pillar garnish 10, preferably in contact with the connection line with main body 13, the load from main body 13 is concentrated on thin portions 19g, 19g', 19g" and the thin portions are more easily fractured. When the fracture is initiated at the connection line, an additional impact absorption effect can be obtained in addition to the impact absorption effect generated by thin portions 19g, 19g', 19g".

Thin portions 19g, 19g' preferably have heights of 10 to 60%, preferably 20 to 50%, and more preferably 30 to 40%, of the height of side wall portions 19d, 19d' (the length between the edge on the side of the back wall and the edge on the side of the main body). By setting the height more than or equal to the lower limit, side wall portions 19d, 19d' and bottom wall portion 19f are more easily deformed, buckled and fractured by an impact load, and by setting the height less than or equal to the upper limit, any decrease in the stiffness of side wall portions 19d, 19d' in the vertical direction can be minimized.

Thin portions 19g, 19g', 19g" preferably have thicknesses of 30 to 70%, preferably 40 to 60%, and more preferably 45 to 55%, of the thickness of thick portions 19k, 19k', 19k". By setting the height more than or equal to the lower limit, side wall portions 19d, 19d' and bottom wall portion 19f are more easily deformed, buckled and fractured by an impact load, and by setting the height less than or equal to the upper limit, any decrease in the stiffness of side wall portions 19d, 19d' in the vertical direction can be minimized.

<Grooves>

Grooves 19h, 19h', 19h" are formed in thick portions 19k, 19k', 19k" of the three upright walls that form the box portion, i.e., a pair of side wall portions 19d, 19d' and bottom wall portion 19f. These grooves 19h, 19h', 19h" are formed at a predetermined depth, measured in the thickness direction from the inside surface of box portion 19. Grooves 19h, 19h' formed on side wall portions 19d, 19d' extend from the boundary with bottom wall portion 19f to guide surfaces 14a, 14a' in the vertical direction of the vehicle, i.e., in the longitudinal direction of pillar garnish 10. Groove 19h" formed on bottom wall portion 19f extends in the horizontal direction of the vehicle to connect side wall 19d to the adjacent side wall 19d'. The grooves may only be provided on any one or two of side wall portions 19d, 19d' and bottom wall portion 19f.

The grooves reduce the strength of side wall portions 19d, 19d' and bottom wall portion 19f, make them less resistive against an impact load applied in the width direction of the vehicle, and thereby improve the impact absorption characteristics. In addition, any decrease in stiffness in the longitudinal direction of pillar garnish 10 (vertical direction of the vehicle) can be minimized. When the thin portion is formed in contact with the edge (the connection line) of the side wall portion facing the main body, fracture is more likely to occur at the edge, and thereby the impact absorption characteristics can be further enhanced.

Ribs 19i, 19i' are formed on back wall portion 19e such that they protrude toward the inside of box portion 19. Ribs 19i, 19i' prevent the air bag from falling into box portion 19. Since ribs 19i, 19i' restrain thick portion 19k" of bottom wall portion 19f, bottom wall portion 19f is more easily bent at groove 19h" and thin portion 19g" is more easily fractured.

Slits 19j, 19j' are formed in the vicinity of the side edges of bottom wall portion 19f that are adjacent to side wall portions 19d, 19d'. Slits 19j, 19j' extend substantially in the horizontal direction from the connection line with main body 13 to an intermediate position. Slits 19j, 19j' reduce the strength of bottom wall portion 19f of box portion 19 while they maintain the stiffness of guide surfaces 14a, 14a'. Slits 19j, 19j' make bottom wall portion 19f, whose break strength is reduced by thin portion 19g" and groove 19h", still more fragile at the edges and further enhance the impact absorption characteristics.

Figure 8:
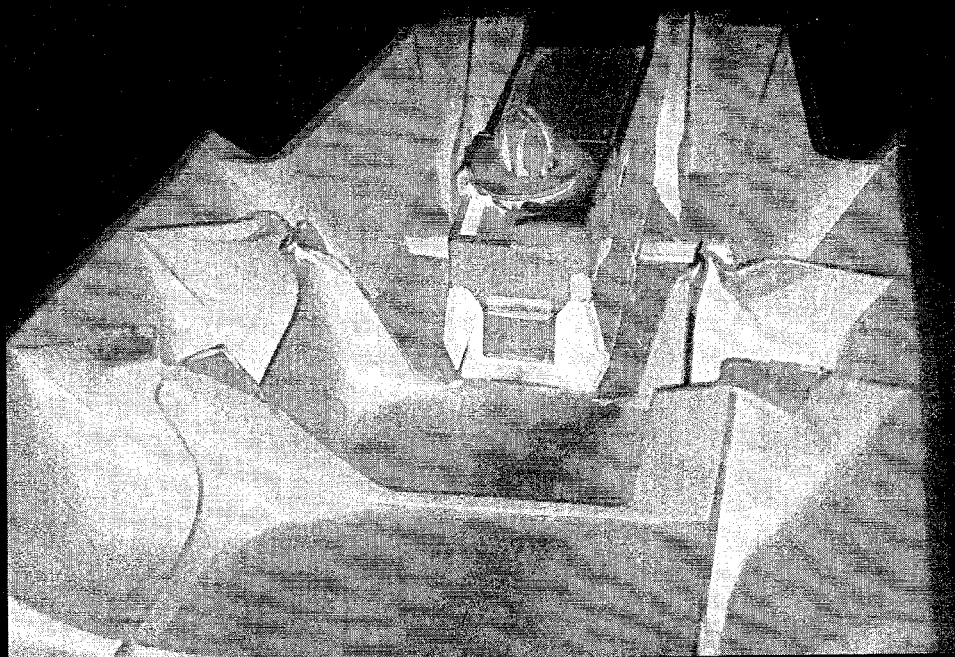
FIG. 8 is a photograph of a pillar garnish (test sample A), taken from the back side, after an impact test is conducted.

FIG. 8 shows a photograph of test sample A prepared for an impact test of pillar garnish 10 (the picture is taken from the back side after the impact test is conducted). Side wall portions 19d, 19d' were bent along the edges and along the boundary lines between thin portions 19g, 19g' and thick portions 19k, 19k'. Bottom wall portion 19f was also bent at locations where the edges of slits 19j, 19j' change their direction. Side wall portions 19d, 19d' were fractured at the edges due to a large bending load applied at the edges.

Figure 9:
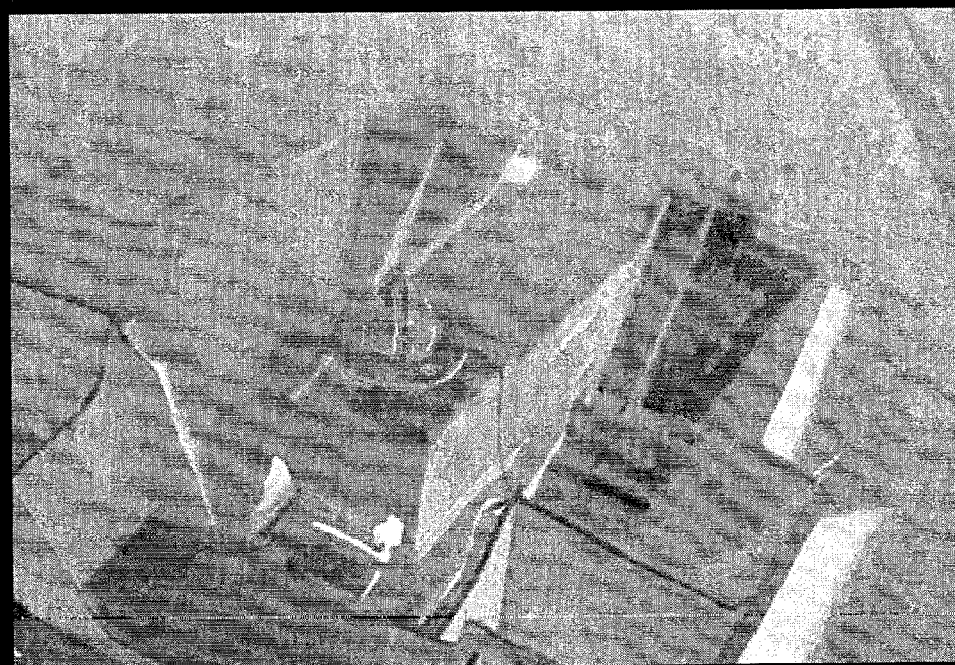
FIG. 9 is a photograph of a pillar garnish (test sample B), taken from the back side, after an impact test is conducted.

Referring to the photograph of test sample B shown in FIG. 9 (the picture is taken from the back side after the impact test is conducted), the height of groove 19h" on bottom wall portion 19f is substantially the same as the heights of the boundary lines between thin portions 19g, 19g" and the thick portions 19k, 19k' of side wall portions 19d, 19d. In other words, groove 19h" and the boundary lines are formed in a line at the same height. When the impact load was applied, deformation started at the boundary lines between thin portions 19g, 19g' and thick portions 19k, 19k' of side wall portions 19d, 19d' and at the edges of side wall portions 19d, 19d', then deformation developed along the side edges of slits 19j, 19j' facing side wall portions 19d, 19d', thereby a L-shaped deformation was formed. As a result, a large load was applied to groove 19h", and groove 19h" was fractured.

Although a certain preferred embodiment(s) of the present invention has (have) been shown and described in detail, it should be understood that various changes and modifications may be made without departing from the spirit and scope of the appended claims.

What is claimed is:

1. A pillar garnish configured to be mounted on a vehicle, the vehicle being provided with an air bag apparatus which is disposed between a left or right edge of a roof trim and a vehicle body panel and which extends in a front-rear direction of the vehicle, wherein the air bag apparatus is unfolded downwards from a left or right side of the vehicle into an interior of the vehicle due to an impact load, the pillar garnish comprising:
- a main body that covers a pillar of the vehicle from the interior of the vehicle;
- an extension part that is formed integrally with the main body, the extension part being positioned on an upper side of the main body when the pillar garnish is mounted on the vehicle, wherein the extension part includes a guide surface at an upper end of the extension part, the guide surface controlling a direction in which the air bag apparatus is unfolded so that the air bag apparatus is unfolded into the interior of the vehicle when the air bag apparatus is inflated; and
- a box portion that is formed integrally with the main body and the extension part, the box portion being positioned between the main body and the pillar when the pillar garnish is mounted on the vehicle,
- wherein the box portion comprises;
  - a back wall portion that extends in a vertical direction and that faces the pillar when the pillar garnish is mounted on the vehicle;
  - a pair of side wall portions that are adjacent to the back wall portion and the main body and that extend in the vertical direction when the pillar garnish is mounted on the vehicle; and
  - a fixing portion that is disposed near the back wall portion, the fixing portion fixing the pillar garnish to the pillar,
- wherein at least one of the side wall portions comprises a thick portion and a thin portion, the thin portion being disposed closer to the main body than to the back wall portion and the at least one of the side wall portions has a groove on the thick portion, the groove extending in the vertical direction when the pillar garnish is mounted on the vehicle.

2. The pillar garnish according to claim 1, wherein the box portion comprises a bottom wall portion that connects the back wall portion to the main body, wherein the bottom wall portion comprises a thick portion and a thin portion, the thin portion of the bottom wall portion being disposed closer to the main body than to the back wall portion.

3. The pillar garnish according to claim 2, wherein the bottom wall portion has a groove on the thick portion of the bottom wall portion, the groove extending in a horizontal direction when the pillar garnish is mounted on the vehicle.

4. The pillar garnish according to claim 2, wherein the bottom wall portion comprises a slit that is disposed adjacent to the side wall portion and that extends in a horizontal direction when the pillar garnish is mounted on the vehicle.

5. The pillar garnish according to claim 3, wherein a boundary line of the thin portion of the side wall portion on a side of the back wall portion and the groove of the bottom wall portion are located at a same distance from the main body.

* * * * *